United States Patent [19]
Larson et al.

[11] Patent Number: 5,530,954
[45] Date of Patent: Jun. 25, 1996

[54] TELECOMMUNICATION FIBER OPTIC PATCH PANEL SHELF ASSEMBLY

[75] Inventors: Glen M. Larson, Liberty Lake; Lloyd W. Lohf, Spokane, both of Wash.

[73] Assignee: Telect, Inc., Liberty Lake, Wash.

[21] Appl. No.: 372,651

[22] Filed: Jan. 13, 1995

[51] Int. Cl.$^6$ ............................................. G02B 6/36
[52] U.S. Cl. ............................................. 385/135
[58] Field of Search ............................. 385/134–139

[56] References Cited

U.S. PATENT DOCUMENTS

| | | | |
|---|---|---|---|
| 4,792,203 | 8/1988 | Nelson et al. | 350/96.2 |
| 4,824,196 | 3/1989 | Bylander | 350/96.2 |
| 4,971,421 | 11/1990 | Ori | 385/135 |
| 5,129,030 | 7/1992 | Petrunia | 385/135 |
| 5,138,688 | 8/1992 | Debortoli | 385/135 |
| 5,167,001 | 11/1992 | Debortoli et al. | 385/135 |
| 5,231,687 | 7/1993 | Handley | 385/135 |
| 5,367,598 | 11/1994 | Devenish, III et al. | 385/135 |

FOREIGN PATENT DOCUMENTS

| | | | |
|---|---|---|---|
| 0434530 | 6/1991 | European Pat. Off. | 385/135 |

OTHER PUBLICATIONS

Product Brochure, "Lightguide Shelf Splice", AT&T Fiber Optics Products, pp. 5–19 and 5–22 (Jan. 1993).

*Primary Examiner*—John Ngo
*Attorney, Agent, or Firm*—Wells, St. John, Roberts, Gregory & Matkin

[57] ABSTRACT

A preferred embodiment of a telecommunication fiber optic patch panel shelf assembly 20 is described having side walls 26 and 28 with side openings 40 adjacent a front wall 30. Distribution fiber optic cable guide members 60 are positioned in the openings 40 to receive, support and guide the distribution cables to fiber optic connecting adapters 48 mounted on a bulkhead 42. Each of the guide members 60 is supported by interior and exterior mounting brackets 62 and 64. The members 60 and the brackets 62, 64 have complementary snap connecting elements to enable the members to be easily mounted to the shelf assembly 20.

9 Claims, 9 Drawing Sheets

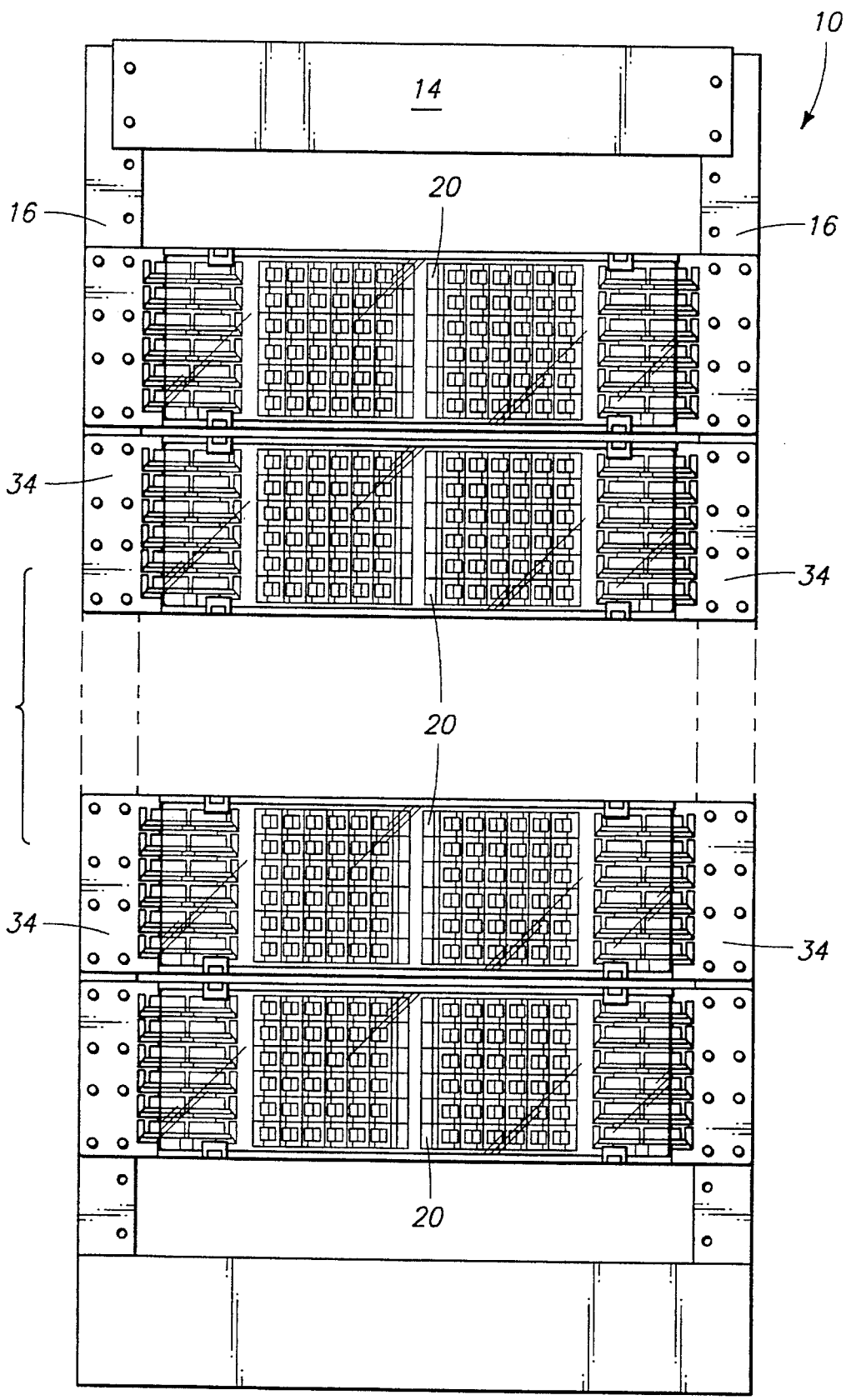

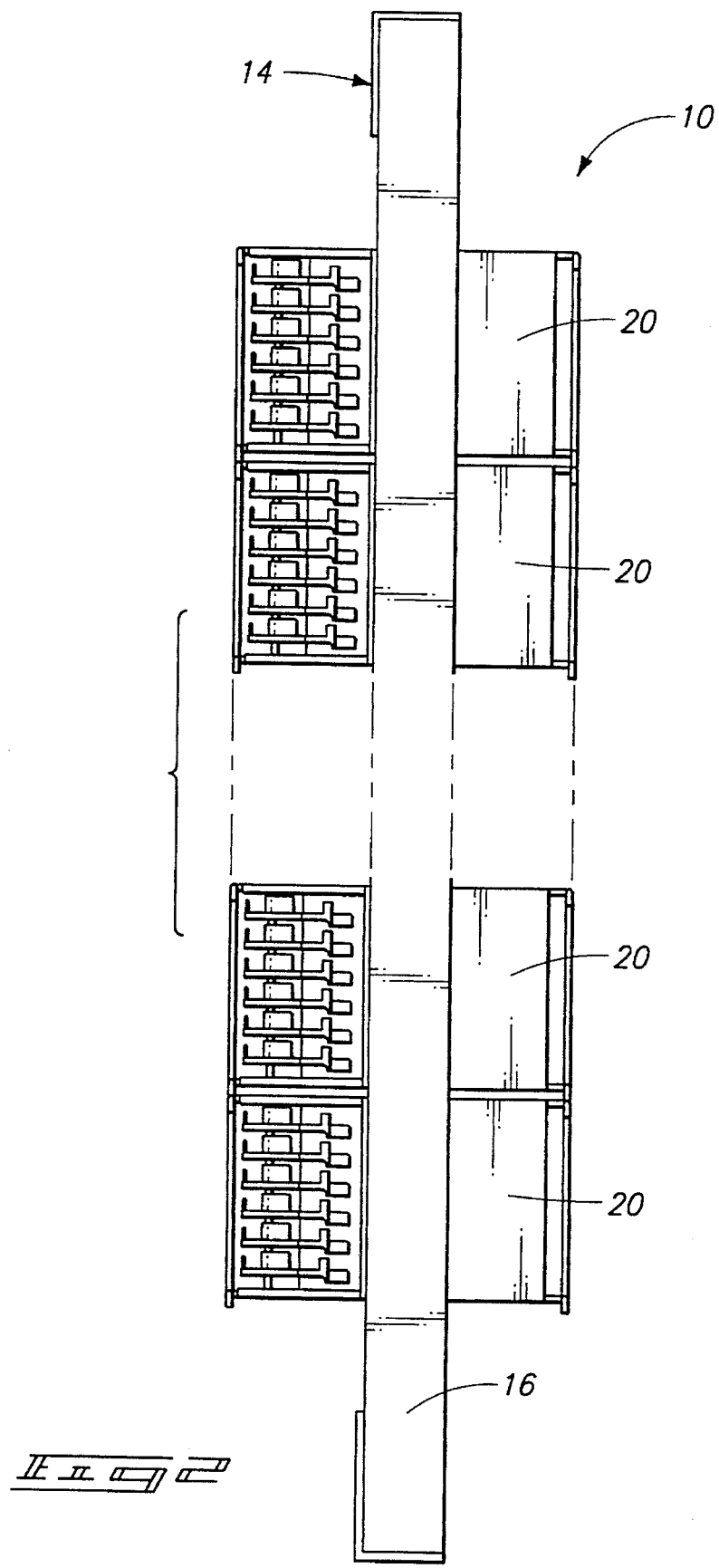

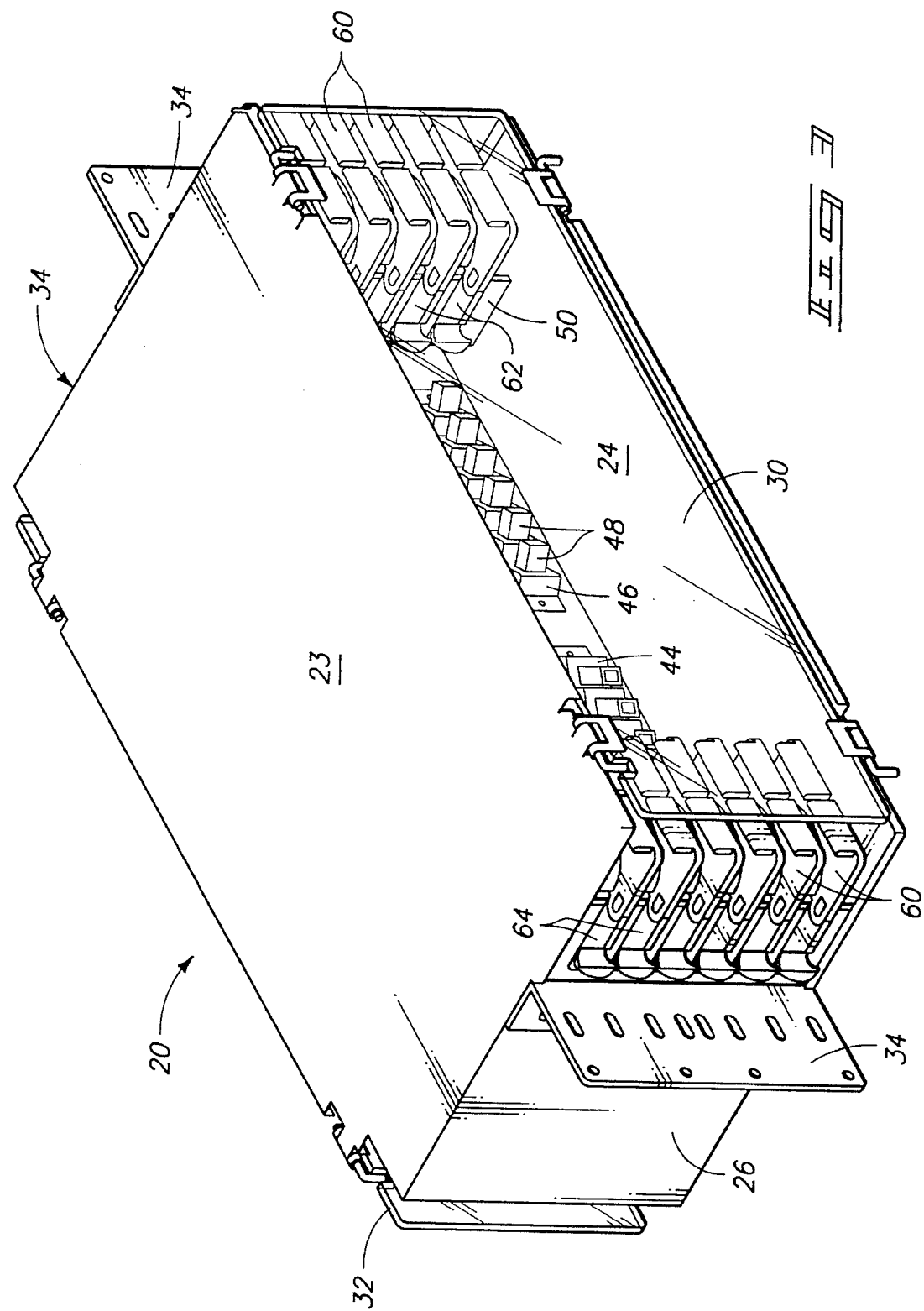

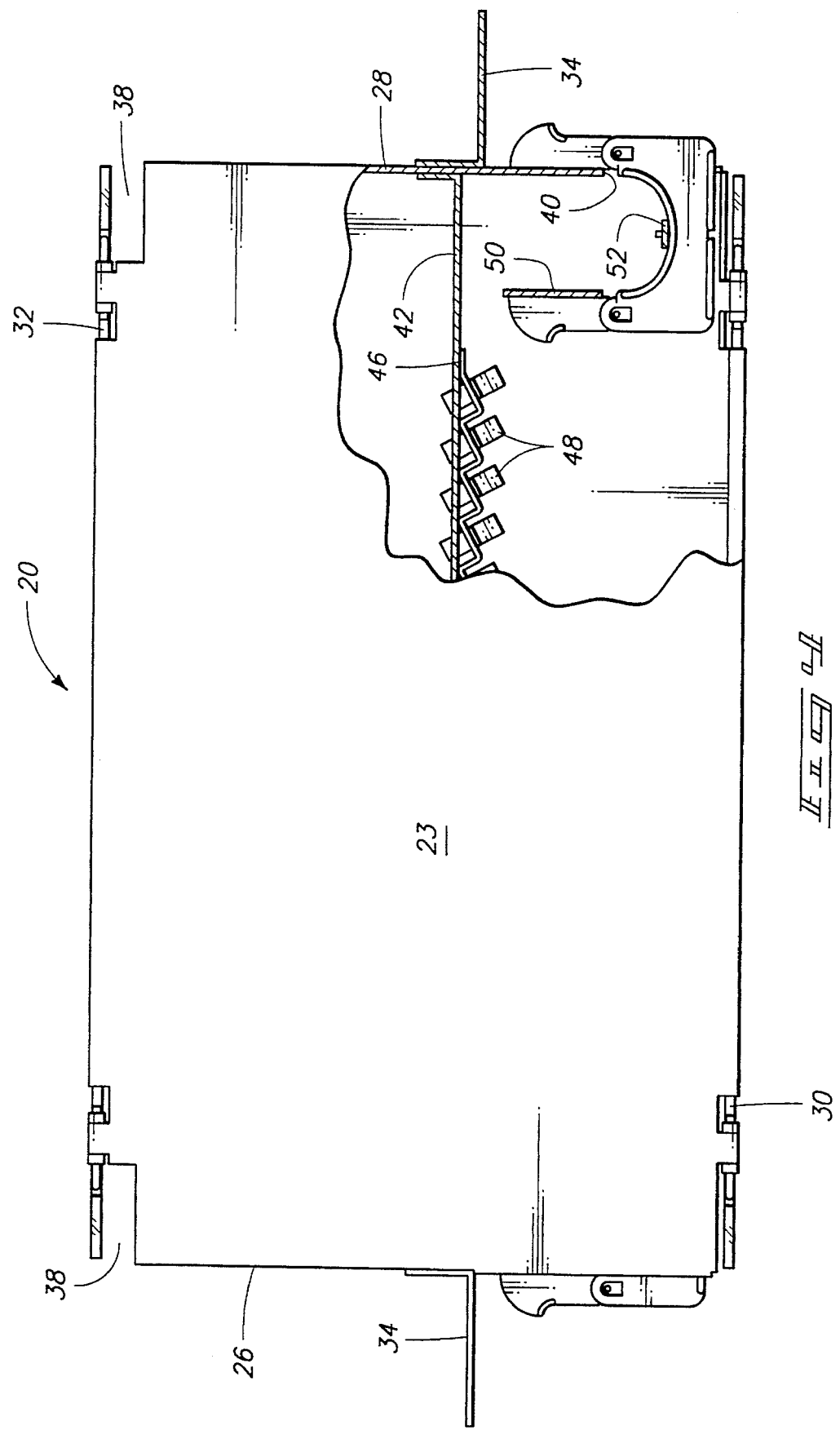

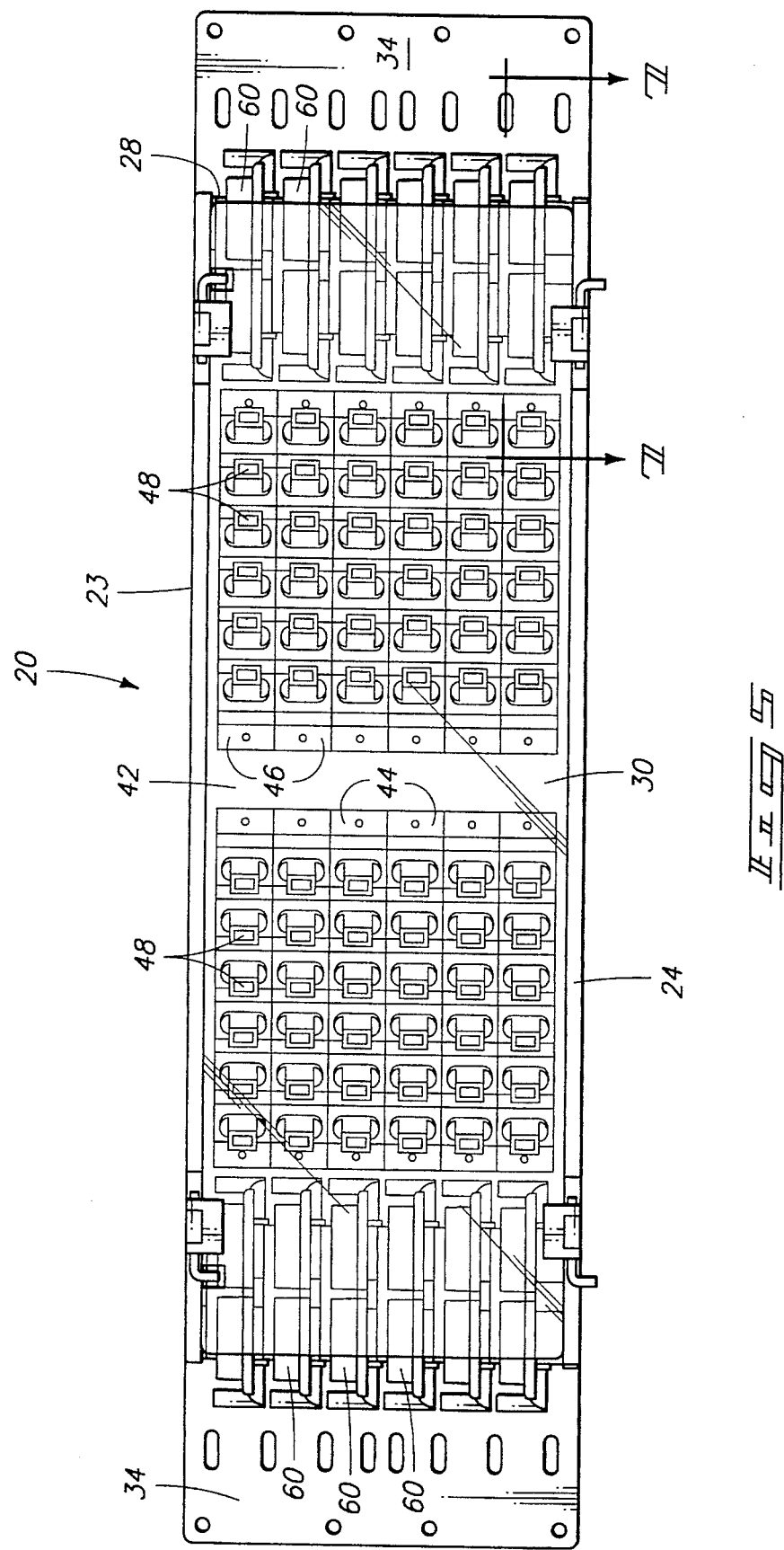

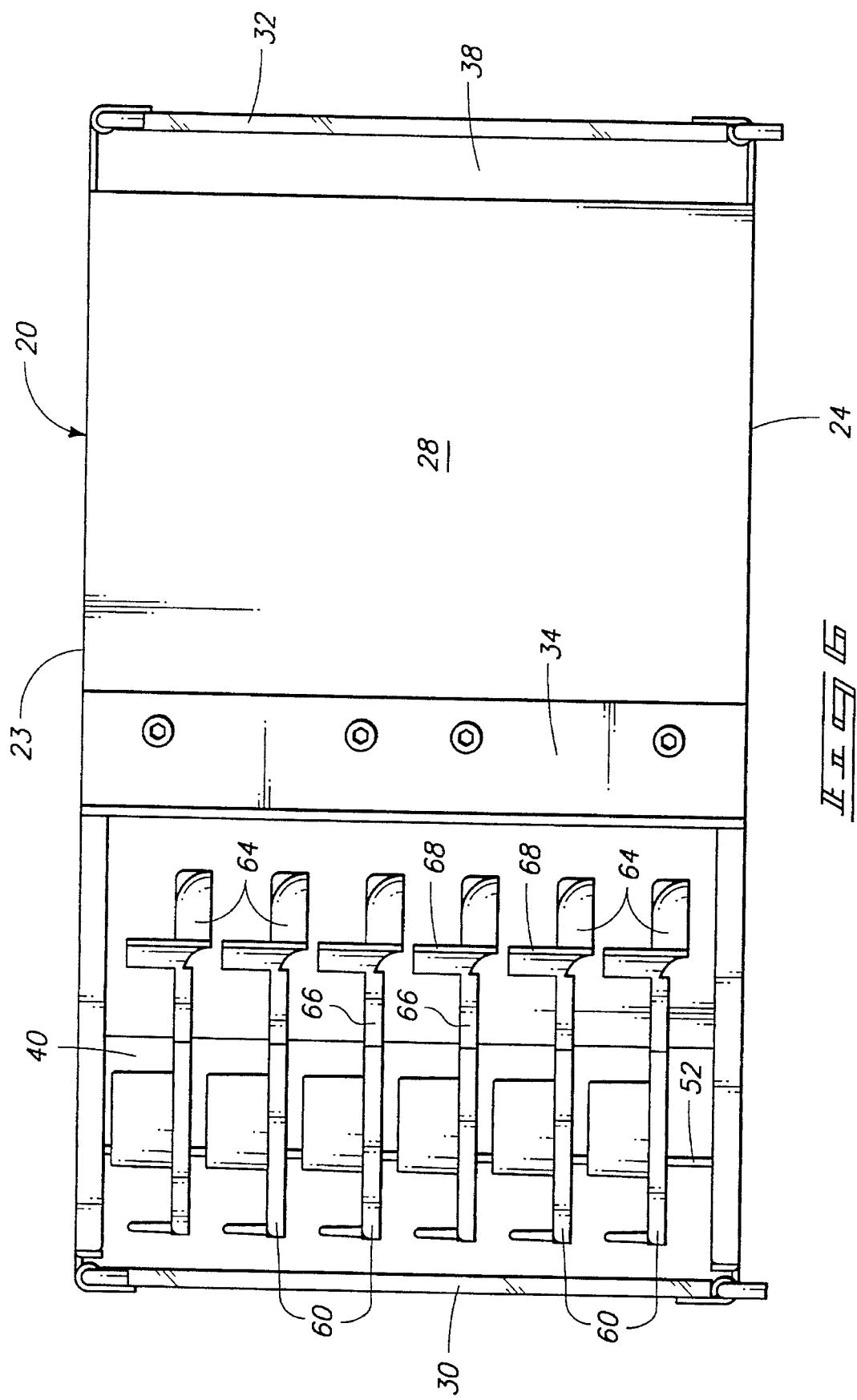

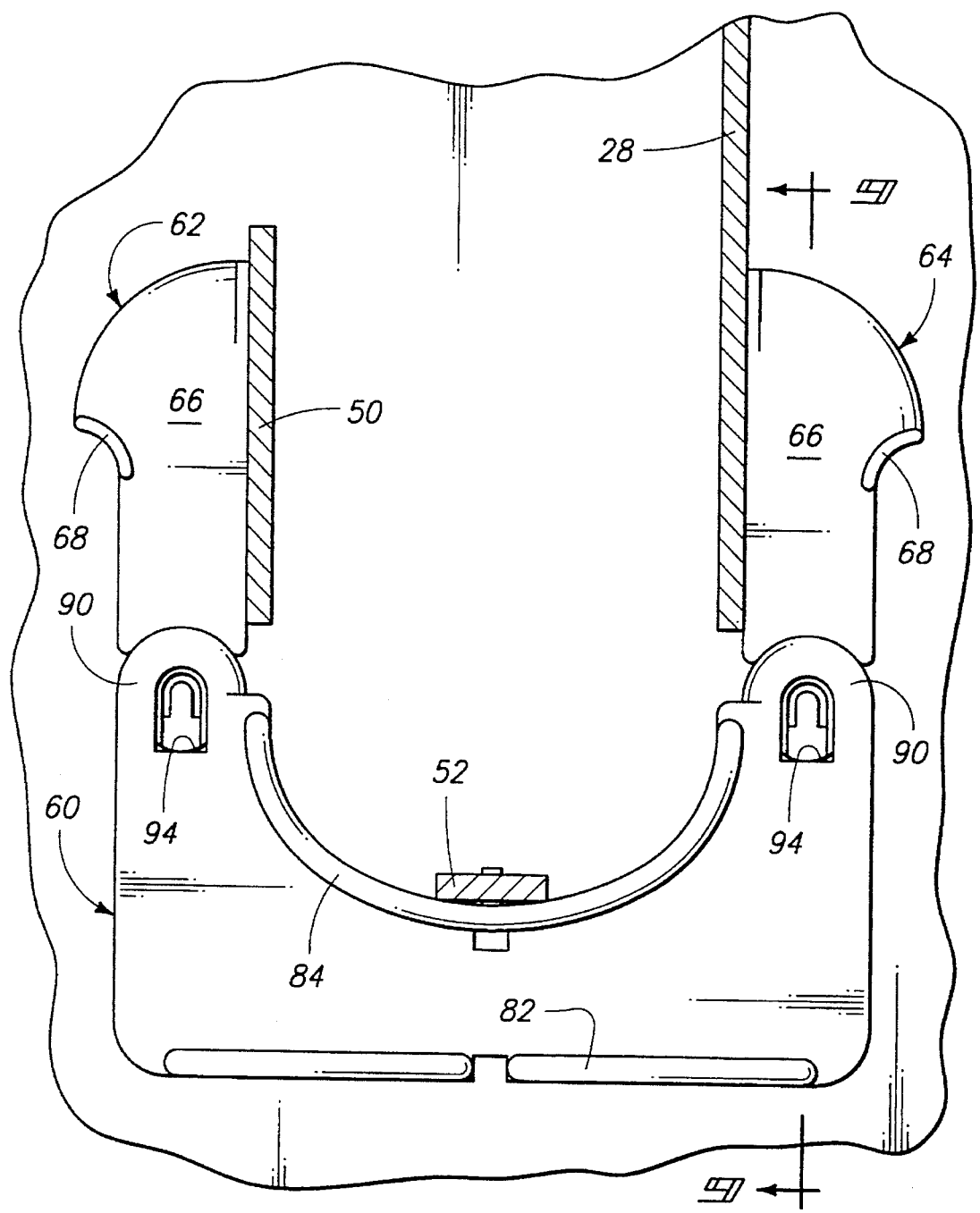

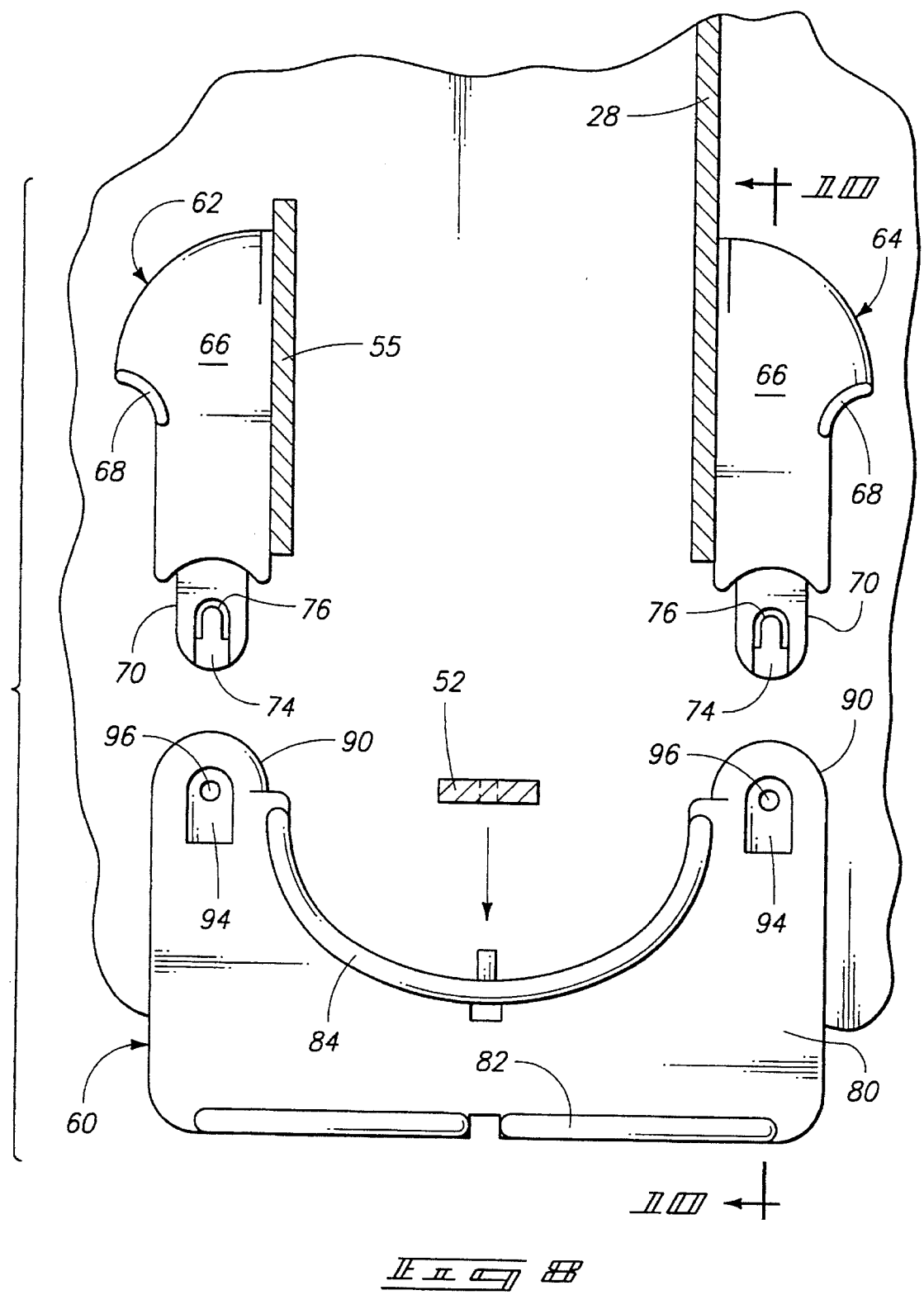

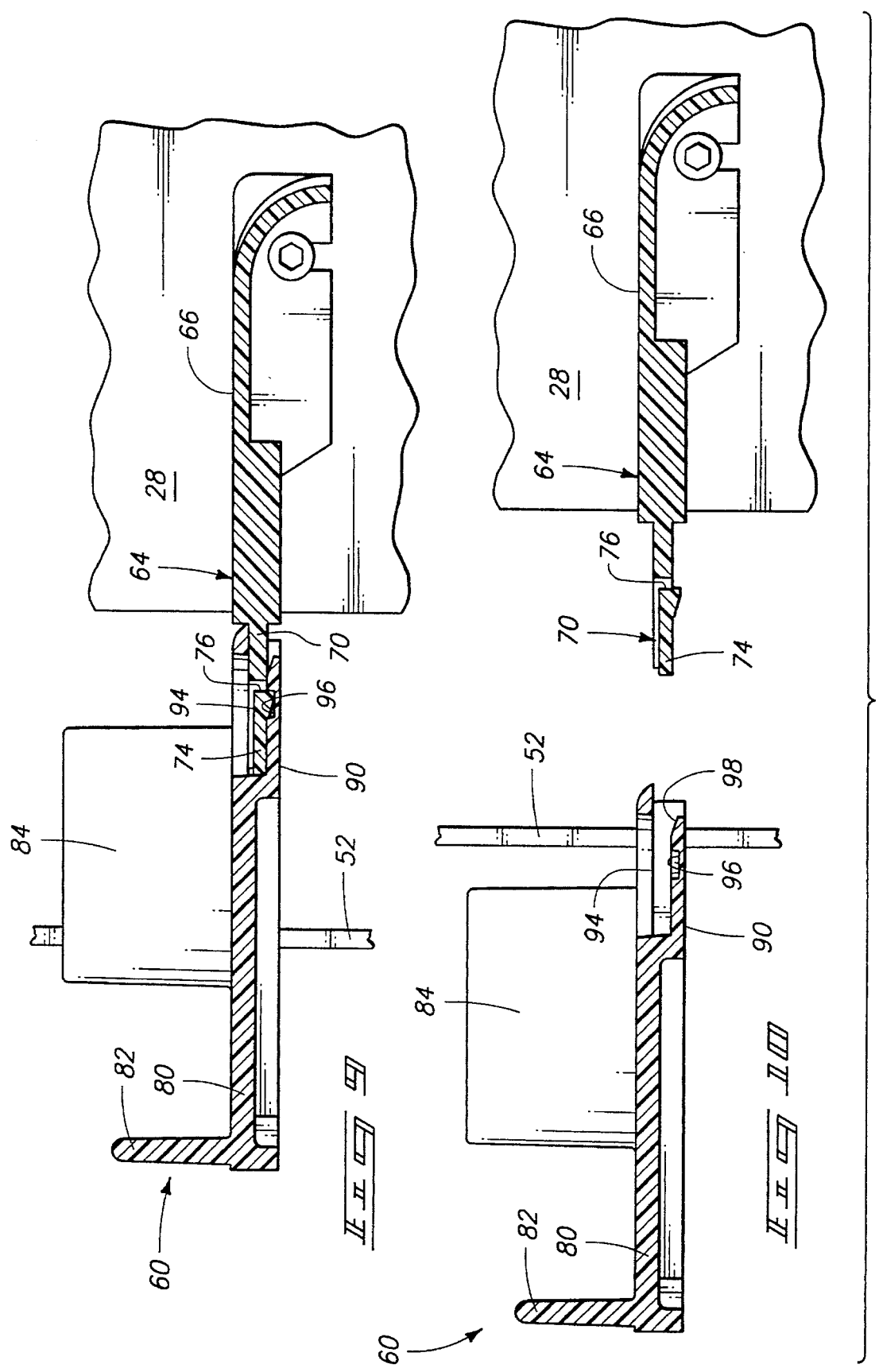

TELECOMMUNICATION FIBER OPTIC PATCH PANEL SHELF ASSEMBLY

TECHNICAL FIELD

This invention relates to telecommunication fiber optic cable distribution bays and panels and more particularly to fiber optic patch panel shelf assemblies for such panels.

BACKGROUND OF THE INVENTION

Generally a telecommunication fiber optic cable distribution bay or panel is located in the central telephone office or at a remote location near or on the customer's premises. The purpose of the distribution bay or panel is to provide termination and cross-connect interface between fiber optic trunk cables and fiber optic distribution cables that lead to user installations. Frequently such panels include shelves that have fiber optic splice, cable storage and/or cross-connect patch capabilities. Normally the shelves have front covers that are closed during normal operation and are opened for installation, repair, monitoring or cross-connecting.

Because of the very delicate and exacting nature of optical fibers, it is important that the individual fiber not be overly bent or unduly stressed in the distribution system. Otherwise, the transmission effectiveness and efficiency may be compromised. Consequently, consideration must be given in the design, construction and operation of the shelves so that the fiber optic cable(s) are not subjected to compromising bends or stresses.

Two examples of previous bays are illustrated in U.S. Pat. No. 4,792,203 granted to Calvin G. Nelson et al. on Dec. 20, 1988, and U.S. Pat. No. 4,824,196 granted to James R. Bylander on Apr. 25, 1989. Both patents describe telecommunication fiber optic distribution bays having multiple shelves in which the shelves are designed having various channels and fixed guide surfaces for holding the fiber optic cables in fixed orientations. Generally, such arrangements are relatively expensive and require substantial time to place the cables in the proper channel.

One of the principal objects and advantages of the present invention is to provide a much improved telecommunication fiber optic distribution patch shelf assembly that better protects the fiber optic cables and prevents the cables from being compromised with undesirable bends or stresses.

An additional advantage of the present invention is to provide a much improved telecommunication fiber optic distribution patch panel shelf assembly that is more efficient in the placement and management of the fiber optic cables within the shelf.

These and other objectives and advantages of this invention will become apparent upon the careful review of the following description of the drawings and description of a preferred embodiment.

BRIEF DESCRIPTION OF THE DRAWINGS

Preferred embodiments of the invention are described below with reference to the accompanying drawings, which are briefly described below.

FIG. 1 is a front elevational view of a preferred embodiment of the present invention illustrating a plurality of fiber optic patch panel shelf assemblies mounted in a telecommunication fiber optic bay.

FIG. 2 is a side elevational view of the preferred embodiment illustrated in FIG. 1.

FIG. 3 is an isolated isometric view of one of the fiber optic patch panel shelf assemblies illustrated in FIG. 1.

FIG. 4 is a plan view of the fiber optic patch panel shelf assembly illustrated in FIG. 3 with a portion of a top wall removed showing a fiber optic patch cord guide member.

FIG. 5 is a front view of the fiber optic patch panel shelf assembly illustrated in FIG. 3.

FIG. 6 is a side view of the fiber optic patch panel shelf assembly illustrated in FIG. 3.

FIG. 7 is a fragmentary horizontal cross-sectional view taken along line 7—7 in FIG. 5. illustrating in more detail the fiber optic patch cable guide member with the member releasably attached to the shelf frame.

FIG. 8 is a fragmentary horizontal view similar to FIG. 7, except showing the guide member being removed.

FIG. 9 is a fragmentary vertical cross-sectional view taken along line 9—9 in FIG. 7.

FIG. 10 is a fragmentary vertical cross-sectional view taken along line 10—10 in FIG. 8.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Turning now in detail to the drawings, there is illustrated in FIG. 1 a telecommunication fiber optic distribution apparatus, generally designated with the numeral 10, for cross-connecting optical fibers of a main trunk cable to optical fibers of distribution cables. The apparatus is frequently referred to as a telecommunication cross-connect bay or panel 10 that is generally located in a central facility of a telephone company or at a remote location near or at a customer's premises.

The trunk fiber optic cables are frequently fed to and from the apparatus 10 from an overhead cable distribution system (not shown).

The apparatus includes an upright rack 14 having at least two spaced upright rack columns 16 on which one or more vertically spaced horizontal distribution fiber optic patch panel shelves 20 are positioned as illustrated in FIGS. 1–2.

A preferred embodiment of the unique distribution fiber optic patch panel shelf 20 is illustrated in more detail in FIGS. 3–6. The shelf 20 has a generally rectangular housing 22 with a roof or top wall 23, a floor or bottom wall 24, spaced side walls 26 and 28, a front cover or front wall 30 and a back cover or back wall 32. Preferably the front and back covers 30, 32 are transparent to enable the user to readily view the interior of the shelf 20. Further it is preferable that the front and back covers are pivotable either upward or downward to unable the telecommunication worker to gain ready access to the interior of the shelf 20.

The housing has side rack mounting brackets 34 that enable the shelf 20 to be affixed at a desired elevation to the rack 14. The side walls 26 and 28 are spaced sufficiently from the front and back walls to provide respective back side openings 38 and front side openings 40.

The housing 22 further includes a fiber optic adapter bulkhead 42 (FIG. 4) that extends between the side walls 26 and 28. The bulkhead supports a plurality of vertically spaced adapter row brackets 44 and 46. The adapter row brackets 44 are mounted in the bulkhead 42 adjacent the side wall 26 and the adapter row brackets 46 are mounted in the bulkhead 42 adjacent the side wall 28 (FIG. 5). Preferably the adapter row brackets 44 and 46 are saw tooth shaped to support fiber optic connector adapters 48 with the adapters facing the side walls 26 and 28, respectively, to minimize bending of the distribution fiber optic cables (FIG. 3 and 4). In the preferred embodiment, the adapter brackets 44, 46 are mounted in six vertically spaced rows with each adapter bracket 44, 46 supporting six adapters 48. Thirty-six adapters 48 face the side wall 26 and thirty-six adapters face the side wall 28. This provides for a seventy-two termination fiber optic patch panel shelf 20.

Additionally, the housing includes internal vertical walls 50 and 52 that are positioned adjacent the side walls 26 and 28 and the front side openings 40 as illustrated in FIGS. 4, 7 and 8.

The shelf 20 further includes a plurality of distribution fiber optic cable guide members 60 that are mounted in the front side openings 40 for supporting and guiding the fiber optic distribution cables between the interior and exterior of the shelf 20 through the front side openings 40 while preventing the distribution cables from being bent in a curvature having a radius of curvature less that 1.5 inches. Preferably six guide members 60 are mounted at vertically spaced levels in the front side opening 40 adjacent side wall 26 and six guide members 60 are mounted at vertically space levels in the side opening 40 adjacent side wall 28.

Each of the guide members 60 are supported by and attached to interior mounting brackets 64 and exterior mounting brackets 62. The brackets 64 are affixed by metal screws to the inside of internal wall 50 and brackets 62 are affixed by metal screws to the outside or exterior of side walls 26 and 28. Each of the brackets 62, 64 have a cable support surface 66 and an upright curved wall 68 for supporting and guiding the distribution cables to and from the guide members 60.

Each of the brackets 62, 64 has a forward projecting arm 70 (FIGS. 8 and 10) with a male connector element 72 formed thereon to releasably connect with a corresponding female connector element 90 of the guide member 60. The male connector element 72 has a forward extending spring lever 74 with an abutment shoulder 76 formed thereon.

Each of the guide members 60 has base 80, a front wall 82 and a back curved wall 84 forming a cable receiving channel for directing a plurality, generally six, distribution fiber optic patch cables through the side openings 40 between the interior and exterior of the shelf 20. Preferably the back curved wall 84 has a radius of curvature greater than 1.5 inches.

Each of the guide members 60 has female connector elements 90 at opposite ends that are complementary and releasably interconnected to the male connector elements 72 as illustrated in FIGS. 7–10. Each female connector element 90 has a female slot 94 (FIG. 10) for receiving the spring lever 74. The slot 94 has a locking recess 96 for receiving and locking with the abutment shoulder 76. A ramp surface 98 is formed adjacent an opening of the female slot 94 for engaging and deflecting the spring lever when the spring lever is initially inserted into the female slot 94. Such an arrangement enables the guide members 60 to be easily mounted to the mounting brackets 62, 64 at the desired lateral and vertical location.

Such a shelf 20 provides easy access to enable a telecommunication worker to patch distribution fiber optic cables to the fiber optic adapters 48 with the cables being "managed", supported and guided into and out of the shelf 20 without placing the cables under stress or undesirable bends.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A telecommunication fiber optic patch panel shelf assembly for mounting to a rack of a telecommunication fiber optic distribution panel for patching a plurality of distribution fiber optic cables to optical fibers of a multi-fiber trunk cable, comprising:

a shelf housing for mounting to the rack;

said housing having a bottom wall, spaced side walls and a front wall defining a housing exterior and interior;

a fiber optic connector adapter bulkhead mounted in the housing interiorly between the spaced side walls for receiving a plurality of adapters to interconnect the plurality of distribution fiber optic cables with the optical fibers of the multi-fiber trunk cable;

a plurality of distribution fiber optic cable guide members mounted to the housing and extending between the interior and exterior of the housing for supporting and guiding the distribution fiber optic cables from the exterior to the interior of the shelf housing;

wherein each of the cable guide members has a base, a front guide wall, and a rear guide wall forming a support channel therebetween for receiving, supporting and guiding a plurality of distribution fiber optic cables; and wherein the rear guide wall is curved having a radius of curvature sufficiently large to prevent detrimental bending of the distribution fiber optic cables.

2. The telecommunication fiber optic patch panel shelf assembly as defined in claim 1 wherein the housing has side wall openings adjacent to the front wall and wherein the distribution fiber optic cable guide members are mounted in the side wall openings extending to the interior and exterior of the housing for supporting and guiding the distribution fiber optic cables.

3. The telecommunication fiber optic patch panel shelf assembly as defined in claim 1 wherein the bulkhead supports the adapters in vertically spaced rows and wherein the plurality of distribution fiber optic cable guides are vertically spaced with each guide member corresponding to an adapter row.

4. The telecommunication fiber optic patch panel shelf assembly as defined in claim 3 wherein the housing has side wall openings adjacent to the front wall and wherein the distribution fiber optic cable guide members are mounted in the side wall openings extending to the interior and exterior of the housing for supporting and guiding the distribution fiber optic cables.

5. The telecommunication fiber optic patch panel shelf assembly as defined in claim 1 wherein the housing has vertically spaced exterior mounting supports and interior mounting supports and wherein the cable guide members are mounted to the interior and exterior mounting supports.

6. The telecommunication fiber optic patch panel shelf assembly as defined in claim 5 wherein the housing has side wall openings adjacent to the front wall and wherein the distribution fiber optic cable guide members are mounted in the side wall openings by the exterior and interior mounting supports for supporting and guiding the distribution fiber optic cables.

7. The telecommunication fiber optic patch panel shelf assembly as defined in claim 1 wherein each of the cable guide members has mounting brackets for attaching to the housing to support each cable guide member at a desired elevation.

8. The telecommunication fiber optic patch panel shelf assembly as defined in claim 1 wherein the housing has vertically spaced exterior mounting brackets and interior mounting brackets and wherein the cable guide members are mounted to the interior and exterior mounting brackets and wherein each of the cable guide members has mounting elements for attaching to the mounting brackets of the housing to support each cable guide member at desired elevation.

9. The telecommunication fiber optic patch panel shelf assembly as defined in claim 1 further comprising fiber optic connector adapters mounted in vertically spaced rows on the bulkhead and wherein each of the distribution fiber optic cable guide is associated with a corresponding row to support and guide the distribution fiber optic toward the adapters.

* * * * *